(12) United States Patent
Taylor et al.

(10) Patent No.: US 11,255,287 B2
(45) Date of Patent: Feb. 22, 2022

(54) APPARATUS AND METHODS FOR ALLOCATING AND INDICATING ENGINE CONTROL AUTHORITY

(71) Applicant: Westinghouse Air Brake Technologies Corporation, Pittsburgh, PA (US)

(72) Inventors: Michael Allen Taylor, Cincinnati, OH (US); Kusuma Kumari Maralla, Bangalore (IN); Scott Christopher Poeppel, Grove City, PA (US); Vinodh Kumar Sreenivasan, Bangalore (IN); James Robert Connelly, Lawrence Park, PA (US); Atul George Tharakan, Bangalore (IN)

(73) Assignee: Westinghouse Air Brake Technologies Corporation

( * ) Notice: Subject to any disclaimer, the term of this patent is extended or adjusted under 35 U.S.C. 154(b) by 0 days.

(21) Appl. No.: 15/771,263

(22) PCT Filed: Sep. 28, 2015

(86) PCT No.: PCT/US2015/052544
§ 371 (c)(1),
(2) Date: Apr. 27, 2018

(87) PCT Pub. No.: WO2017/058133
PCT Pub. Date: Apr. 6, 2017

(65) Prior Publication Data
US 2018/0328301 A1 Nov. 15, 2018

(51) Int. Cl.
*F02D 41/22* (2006.01)
*B63H 21/21* (2006.01)
(Continued)

(52) U.S. Cl.
CPC ............. *F02D 41/22* (2013.01); *B63H 21/21* (2013.01); *F02D 41/266* (2013.01);
(Continued)

(58) Field of Classification Search
CPC ....... F02D 41/22; F02D 41/266; B63H 21/21; G06F 11/1629; G06F 11/1641;
(Continued)

(56) References Cited

U.S. PATENT DOCUMENTS 2,916,634 A * 12/1959 Mcfarland ................ H02J 3/38
290/30 R
4,011,534 A * 3/1977 Flanagan ............. H01H 50/326
335/186

(Continued)

FOREIGN PATENT DOCUMENTS

| CN | 85105778 A | 3/1987 |
| CN | 102073562 A | 5/2011 |

(Continued)

OTHER PUBLICATIONS

Office Action dated May 26, 2021 for related Russian Patent Application No. 201890742 (4 pages).

(Continued)

*Primary Examiner* — Logan M Kraft
*Assistant Examiner* — Joshua Campbell
(74) *Attorney, Agent, or Firm* — The Small Patent Law Group LLC; Josef L. Hoffman

(57) ABSTRACT

A control apparatus includes a first controller configured to generate control signals for controlling an engine or other machine, a second controller configured to generate the control signals for controlling the machine, a transfer circuit, and an arbiter circuit. The transfer circuit is coupled between the machine and the controllers, and is configured to switch from a first state, where the transfer circuit passes the control (Continued)

signals from the first controller to the machine, to a second state, where the transfer circuit passes the control signals from the second controller to the machine, responsive to receiving a first failure signal from the first controller. The arbiter circuit includes three (or more) arbiters, and is configured to control the transfer circuit from the first state to the second state responsive to any two of the three arbiters generating second signals indicative of failure of the first controller.

17 Claims, 5 Drawing Sheets

(51) Int. Cl.
*F02D 41/26* (2006.01)
*G06F 11/16* (2006.01)
*G06F 11/18* (2006.01)

(52) U.S. Cl.
CPC .. *B63H 2021/216* (2013.01); *F02D 2041/227* (2013.01); *F02D 2200/101* (2013.01); *F02D 2200/1012* (2013.01); *G06F 11/1629* (2013.01); *G06F 11/1641* (2013.01); *G06F 11/1654* (2013.01); *G06F 11/18* (2013.01); *G06F 11/183* (2013.01); *G06F 11/184* (2013.01); *G06F 11/187* (2013.01); *G06F 11/188* (2013.01)

(58) Field of Classification Search
CPC .... G06F 11/1654; G06F 11/18; G06F 11/183; G06F 11/184; G06F 11/187; G06F 11/188
See application file for complete search history.

(56) References Cited

U.S. PATENT DOCUMENTS

| | | | | |
|---|---|---|---|---|
| 4,989,569 A | * | 2/1991 | Eidler | F02D 41/266 123/359 |
| 5,550,736 A | * | 8/1996 | Hay | G05B 9/03 244/76 R |
| 5,577,199 A | * | 11/1996 | Tanabe | G06F 11/185 714/37 |
| 6,038,683 A | * | 3/2000 | Shimamura | G05B 9/03 707/999.202 |
| 6,480,780 B1 | | 11/2002 | Schwamm | |
| 6,563,837 B2 | * | 5/2003 | Krishna | H04L 12/5601 370/413 |
| 2003/0012210 A1 | * | 1/2003 | Van Wageningen | H04L 47/623 370/419 |
| 2004/0088991 A1 | | 5/2004 | Gallant et al. | |
| 2009/0143924 A1 | * | 6/2009 | Griffith | G06F 11/18 701/3 |
| 2012/0302113 A1 | * | 11/2012 | Alzemi | B63H 1/26 440/53 |
| 2013/0079894 A1 | | 3/2013 | Kamenetz et al. | |

FOREIGN PATENT DOCUMENTS

| | | | | |
|---|---|---|---|---|
| CN | 203084594 U | | 7/2013 | |
| CN | 103362653 A | | 10/2013 | |
| CN | 103455005 A | | 12/2013 | |
| DE | 102013201702 A1 | | 8/2014 | |
| GB | 2255422 A | * | 11/1992 | ........... F02D 41/266 |
| GB | 2255422 A | | 11/1992 | |
| GB | 2303225 A | | 12/1997 | |
| GB | 2355081 A | | 4/2001 | |
| JP | 2002206457 A | | 7/2002 | |
| WO | WO-2007020466 A2 | * | 2/2007 | ........... G06K 9/6284 |

OTHER PUBLICATIONS

English translation of the Office Action dated May 26, 2021 for related Russian Patent Application No. 201890742 (3 pages).
English Translation of the Office Action issued for corresponding Eurasian Patent Application No. 201890742 dated Oct. 19, 2020 (3 pages).
Office Action issued forconresponding Eurasian Patent Application No. 201890742 dated Oct. 19, 2020 (3 pages).
English Translation of the Office Action issued for corresponding Chinese Patent Application No. 201580084916.2 dated Jul. 27, 2020 (8 pages).
Office Action issued for corresponding Chinese Patent Application No. 201580084916.2 dated Jul. 27, 2020 (10 pages).
Search Report for corresponding Chinese Patent Application No. 201580084916.2 dated Jul. 27, 2020 (3 pages).
First Examination Report issued for related Indian Patent Application No. 201847015770 dated Feb. 26, 2021 (6 pages).

* cited by examiner

APPARATUS AND METHODS FOR ALLOCATING AND INDICATING ENGINE CONTROL AUTHORITY

FIELD OF THE INVENTION

Embodiments of the invention relate generally to engine control units. Particular embodiments relate to allocating and indicating engine control authority among redundant engine control units.

BACKGROUND OF THE INVENTION

Marine vessels and other vehicles may include a main controller for engine control. If the controller fails, this may result in a sudden and unexpected stoppage of the vehicle, or the vehicle otherwise failing to function as per design. Because of this, some vehicles are outfitted with redundant controllers, e.g., a main controller and a backup or standby controller. However, such systems may be subject to delayed transfer of control, which may result in vehicle stalling. Additionally, if control is transferred to the backup controller even if the main controller has not failed in actuality, this may result in conflicting control signals, and/or the repeated transfer of control back and forth between the controllers (i.e., chatter or flutter in the transfer logic), which can negatively affect vehicle performance.

Accordingly, it may be desirable to provide a control system or method for an engine that differs from existing systems and methods.

BRIEF DESCRIPTION OF THE INVENTION

In an embodiment, a control apparatus (e.g., control apparatus for controlling an engine or other machine) includes a first controller configured to generate control signals for controlling an engine or other machine, a second controller (e.g., a backup or secondary controller) configured to generate the control signals for controlling the machine, a transfer circuit, and an arbiter circuit. The transfer circuit is coupled between the machine and respective control outputs of the first controller and the second controller. The transfer circuit is configured to switch from a first state, where the transfer circuit passes the control signals from the first controller to the machine, to a second state, where the transfer circuit passes the control signals from the second controller to the machine, responsive to receiving a first failure signal from the first controller. (For example, the first controller may be configured to generate the first failure signal upon a self-determination that the first controller has failed, entered into a fault state or condition, or is otherwise not functioning nominally. The first failure signal may be a zero voltage signal that is generated by the first controller based on the self-determination, or upon the first controller powering off.) The arbiter circuit is operably coupled to the transfer circuit and has at least three arbiters. The arbiter circuit is configured to control the transfer circuit from the first state to the second state (for passage of the control signals from the second controller to the machine instead of from the first controller to the machine) responsive to any two or more of the at least three arbiters generating second failure signals. In an embodiment, the arbiters are configured to generate the second failure signals responsive to determining that the first controller has failed, entered into a fault state or condition, or is otherwise not functioning nominally, e.g., based on comparing a sensed operational condition of the machine, such as sensed engine speed, to a commanded operational condition of the machine, such as commanded engine speed from a throttle or other operator control. In this manner, according to aspects of the invention, machine control is switched to the second controller even if the main controller does not generate the first failure signal responsive to failure of the main controller. This happens, however, only upon a majority "vote" of the arbiters, which reduces switching back and forth between the controllers, erroneously switching control to the second controller, etc.

In another embodiment, a method (e.g., a method of controlling an engine or other machine) includes, with a first controller, generating control signals to control a machine. The method further includes, with a second controller, generating the control signals to control the machine, and, with a transfer circuit coupled between the machine and respective control outputs of the first controller and the second controller, switching from a first state, wherein the transfer circuit passes the control signals from the first controller to the machine, to a second state, wherein the transfer circuit passes the control signals from the second controller to the machine. The switching from the first state to the second state is done responsive to receiving a first failure signal from the first controller. The method further includes, with an arbiter circuit operably coupled to the transfer circuit and having at least three arbiters, controlling the transfer circuit from the first state to the second state responsive to any two or more of the at least three arbiters generating second failure signals.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
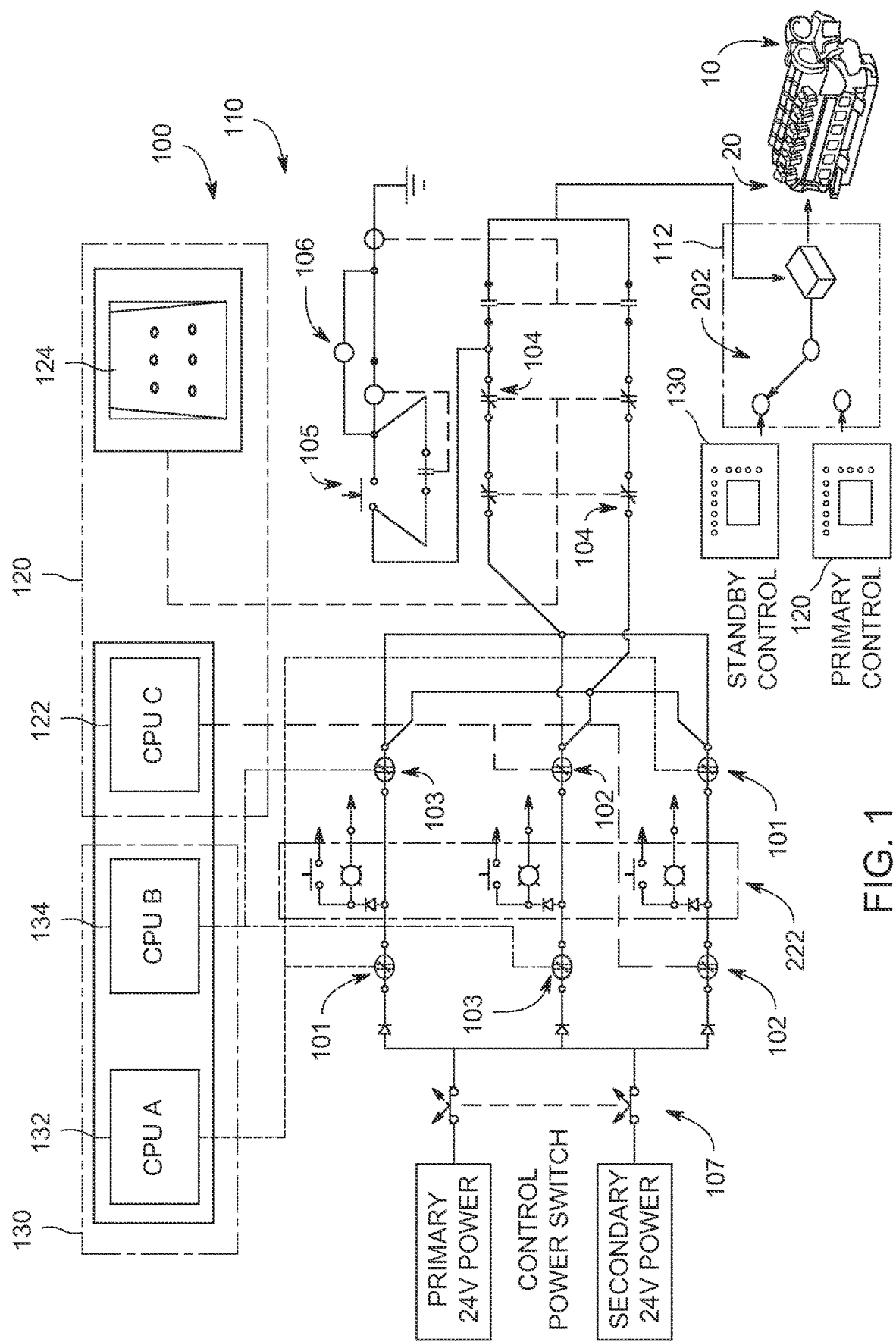
FIG. 1 is a schematic diagram of a control apparatus, according to an embodiment of the invention.

Reference will be made below in detail to exemplary embodiments of the invention, examples of which are illustrated in the accompanying drawings. Wherever possible, the same reference characters used throughout the drawings refer to the same or like parts, without duplicative description. Although exemplary embodiments of the present invention are described with respect to single engine propulsion systems, embodiments of the invention also are applicable to any propulsion or other system requiring allocation of authority among redundant control units.

Referring to FIG. 1, aspects of the invention relate to an apparatus (e.g., control apparatus) having a transfer unit 100.

The transfer unit 100 is associated with an engine 10, to which fuel pump solenoids 20 supply fuel. The transfer unit 100 implements an arbiter panel process 110 (shown in FIG. 5) for operating a transfer relay 112 to allocate control of the fuel pump solenoids 20 between a main controller 120 or a standby controller 130. In its default (de-energized, startup) condition, the transfer relay 112 allocates control to the standby controller 130.

The main controller 120 includes a main supervisory input/output module (SIOM) 122 as well as a main engine control unit (ECU) 124. The main SIOM 122 is configured for receiving and conditioning analog and/or digital signals sent from the engine 10, and for passing the conditioned signals to the main ECU 124. The main SIOM 122 also is configured as a first arbiter for monitoring operational status of the main ECU 124, e.g., indicating a failure in case the main ECU 124 is not producing commands that result in the engine 10 delivering ordered propulsion. The main ECU 124 is configured for receiving propulsion orders from an operator, processing the conditioned signals to determine how to accomplish the propulsion orders, and sending commands to the fuel pump solenoids 20 and to other parts of the engine 10 in order to accomplish the propulsion orders.

The standby controller 130 similarly includes a standby supervisory input/output module (SIOM) 132 as well as a standby engine control unit (ECU) 134. The standby SIOM 132 is configured for receiving and conditioning analog and/or digital signals sent from the engine 10, and for passing the conditioned signals to the standby ECU 134. The standby SIOM 132 also is configured as a second arbiter for monitoring operational status of the main ECU 124, e.g., indicating a failure in case the main ECU 124 is not producing commands that result in the engine 10 delivering ordered propulsion. The standby ECU 134 is configured for receiving propulsion orders from an operator, processing the conditioned signals to determine how to accomplish the propulsion orders, and sending commands to the fuel pump solenoids 20 and to other parts of the engine 10 in order to accomplish the propulsion orders. The standby ECU 134 also is configured as a third arbiter for monitoring operational status of the main ECU 124.

The transfer unit 100 includes several (normally closed) arbiter relays 101, 102, 103 that respectively receive actuating signals from the three arbiters 122, 132, 134. The transfer unit also includes two (normally open) main relays 104 (MECUOK1, MECUOK2) that receive their actuating signal from the main ECU 124, a start switch 105 within a maintaining circuit that is used for energizing a (normally open) reset relay 106 at startup, and a control power/force-over switch 107 through which the transfer unit receives primary and secondary power. In order for the transfer unit 100 to allocate control to the main controller 120, at least two of the three arbiter relays must be de-energized (normally closed condition), while the main relay and the reset relay must be energized (normally open condition); additionally, the transfer unit must be receiving power from at least one of the primary and secondary power sources. Otherwise, the transfer unit 100 will not energize the transfer relay 112. Accordingly, even while the main controller 120 is normally operating, the control power switch 107 can be opened to de-energize the entire transfer unit 100 and thereby force over control to the standby controller 130.

Thus, at startup, the transfer unit 100 allocates control to the standby controller 130. More particularly, the transfer unit 100 leaves the transfer relay 112 in its default, de-energized condition, such that commands sent from the standby controller 130 reach the engine, while commands from the main controller 120 go nowhere. Once both the main and standby controllers have checked out satisfactorily, an operator can actuate the start switch 105 that energizes the reset relay 106, thereby causing the transfer unit 100 to energize the transfer relay 112 into its run condition, in which the transfer relay allocates (shifts) control to the main controller 120. Then, under normal circumstances, the maintaining circuit associated with the start switch 105 keeps the reset relay 106 energized. Thus, both the main controller 120 and the standby controller 130 monitor engine performance and order signals and issue appropriate commands for the fuel pump solenoids 20 (or other engine controls). But the transfer relay 112 in its run condition only passes to the fuel pump solenoids 20 the commands sent from the main controller 120.

In case the main controller 120 fails, the transfer unit 100 then is meant to restore the transfer relay 112 to its default or startup condition, in which the transfer relay interrupts commands sent from the main controller 120 and passes commands from the standby controller 130 to the fuel pump solenoids 20. Failure of the main controller 120 can be indicated directly by loss of power from the main ECU 124 to the main relay 104, in which the transfer relay 112 will revert to its startup (de-energized) condition. Alternatively, any of the arbiters 122, 132, 134 may detect a failure of the main ECU 124, and de-energize its respective arbiter relay 101, 102, or 103.

Tautologically, the main ECU 124 cannot provide a false indication of its own failure. However, it can provide a false indication of its own proper functioning. Meanwhile, the arbiters 122, 132, 134 may provide true or false indications as to proper operation of the main ECU 124. It may be desirable to not shift the transfer relay 112 without proper reason. Accordingly, the transfer unit 100 implements an arbiter panel process 110 for voting whether the main ECU 124 is properly operating.

More particularly, during normal operation the main ECU 124 constantly sends out a signal via a digital output off the ECU to the main relay 104 within the transfer unit 100. The signal serves as a system normal status, and maintains the main ECU OK relays 104 in a closed condition so that the transfer relay 112 is held connected to the main ECU 124 command signals, thereby maintaining main controller control over the engine. For example, the system normal indication may utilize a current EFR output of an engine control system for driving transfer. In case the main ECU 124 loses power or otherwise fails, it stops sending commands and also allows the main relay 104 to open, thereby shifting the transfer relay 112 over to the standby controller 130.

In case the main ECU 124 fails to sense or indicate its own failure, the main relay 104 will remain energized, so that without other inputs to the transfer unit 100, the transfer relay 112 would remain in its run condition sending commands from the failed main ECU 124 to the fuel pump solenoids 20. In order to prevent this situation, the arbiters consisting of the main SIOM 122, the standby SIOM 132, and the standby ECU 134 are provided to ensure the transfer relay 112 shifts back to its startup condition. The arbiter relays 101, 102, 103 are connected in a series-parallel network such that all three arbiters shall have an equal vote on the transfer to the standby, but only two of the three need to determine that a transfer is necessary. Each arbiter can vote for a transfer by driving one of its digital outputs high to energize and open its respective normally closed relay. Consequently, in case an arbiter has lost power, it cannot vote for transferring control to itself.

Figure 3:
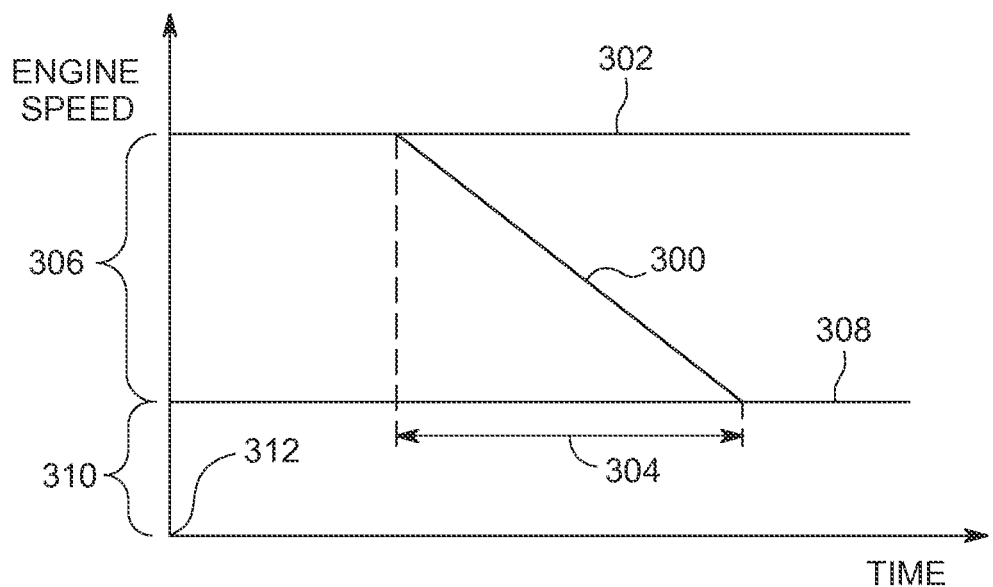
FIG. 3 shows diagrammatically an engine speed error deadband for arbiting engine control transfer, according to an aspect of the invention.

In certain embodiments, the main SIOM 122, the standby SIOM 132, and the standby ECU 134 arbitrate control allocation based upon engine speed response to ordered speed, as shown in FIG. 3. Each arbiter 122, 132, 134 receives an engine speed signal 300 from an independent speed sensor (not shown in this view), and also receives an ordered speed reference signal 302. Each arbiter compares the speed of the engine, the rate of change of speed of the engine, and the speed reference signal. In case the engine speed (e.g., RPM) is continuously decreasing in respect to the speed reference signal for at least 500 milliseconds (or another designated time period 304), or has fallen below a deadband of 150 RPM less (or other designated speed amount 306) than ordered speed, or has fallen below an absolute floor 308 set at a margin 310 above engine idle speed 312, then the arbiter will vote for transfer to the standby controller.

Thus, embodiments of the invention have certain salient features, namely, transfer through relay logics, transfer on loss of power, and no single point failure. The transfer unit 100 provides a quick-response backup system to ensure continuity of operation by instantly responding to main controller failure, provides redundancy both in hardware and software aspects of controller thereby preventing mission failure, reduces risk of downtime, reduces risk of mission failure, and improves reliability. Moreover, especially with reference to a single engine vessel, the arbiter panel process 110 helps to ensure that failure of the main ECU 124 does not degrade or shut down the engine 10, but shifts the control from main to standby ECU 134 and maintains the engine performance.

Figure 2:
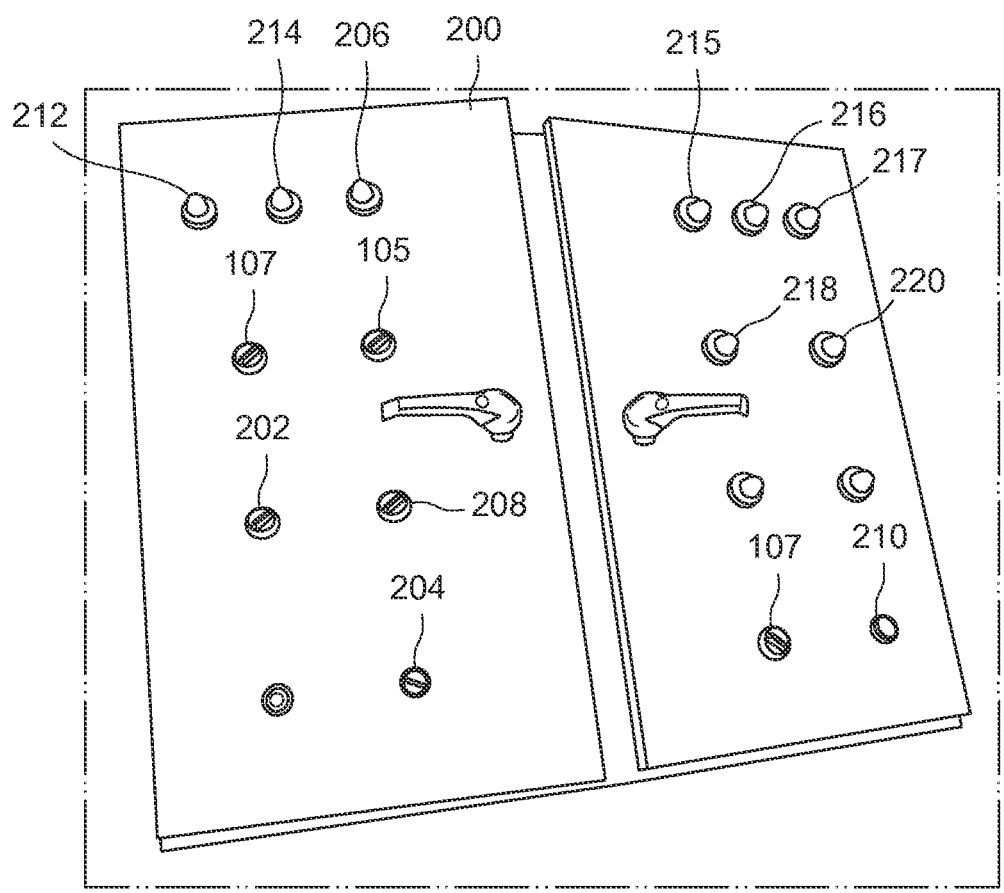
FIG. 2 shows an operator interface of a control apparatus, according to an embodiment of the invention.

Referring to FIG. 2, in embodiments, the transfer unit 100 has an operator panel 200 that incorporates switches and annunciators for allocating and indicating engine control authority among the main controller 120 and the standby controller 130. Certain aspects of the invention relate to design and operation of the transfer unit interface 200, which will allow for manual operation of the transfer process, and will have indicating lights (annunciators) on the front with several different status indicators. Thus, the interface 200 will inform an operator as to behavior of the transfer unit 100 via visual and/or audible indications.

The switches include a manually operable transfer override switch 202 (also shown in FIG. 1), which can be operated to force allocation of control to the main controller 120, regardless of electrical conditions within the transfer unit 100. The switches also include the force-over switch 107, mentioned above, the start switch 105, a local/remote control location switch 204, an emergency stop button 206, an engine speed adjust switch 208, and a reset button 210 that manually operates the reset relay 106. When the local/remote control location switch 204 is in its local position, the engine speed adjust switch can be operated to send speed adjust signals to the main ECU 124 and to the standby ECU 134; otherwise, the ECUs 124, 134 look to the wheelhouse or other operator cab for engine orders. The annunciators include primary and secondary power supply lights 212, 214; arbiter relays lights 215, 216, 217 that are energized by high signals sent to their respective arbiter relays 101, 102, 103; and status of control lights 218 (main) and 220 (standby).

Thus, the transfer box interface 200 helps in annunciating conditions of the transfer unit 100 and in allowing an operator to quickly adjust those conditions using manual switches. The annunciator/switch controls of the interface 200 are grouped into four major categories: engine controls, transfer functions, power supply indications, and override functions.

Additionally, in certain embodiments the transfer box interface 200 includes a transfer self test button 222 (also shown in FIG. 1), which provides for transfer functionality self-test by diverting power within the transfer unit 100 from the transfer relay 112 to unit ground. This aspect of the invention provides capability to intentionally and temporarily transfer control from main controller to standby controller by pressing and holding the transfer self test button. In other embodiments, each of the main controller 124 and the standby controller 134 has a respective touchscreen interface 126 or 136, on which a "transfer test" key or button is provided, thereby simulating the actual transfer of control in the event of the failure of the main controller. The transfer test button is provided in the display to test whether the transfer function works correctly and transfer actually occurs from the main controller to the standby controller. When the transfer test button is pressed an operator can observe the status of control lights 218, 220 to verify that the control is actually passed from the main controller 120 to the standby controller 130. The transfer test button is visible on the touchscreens only when the main ECU 124 is in control and the transfer override switch is inactive. When the transfer test button is pressed in one of the touchscreens 126 or 136, then the display communicates to the main ECU 124, for example via Arcnet or another common data bus protocol, to drop the transfer digital output from high to low and initiate the transfer to the standby controller 130.

Figure 4:
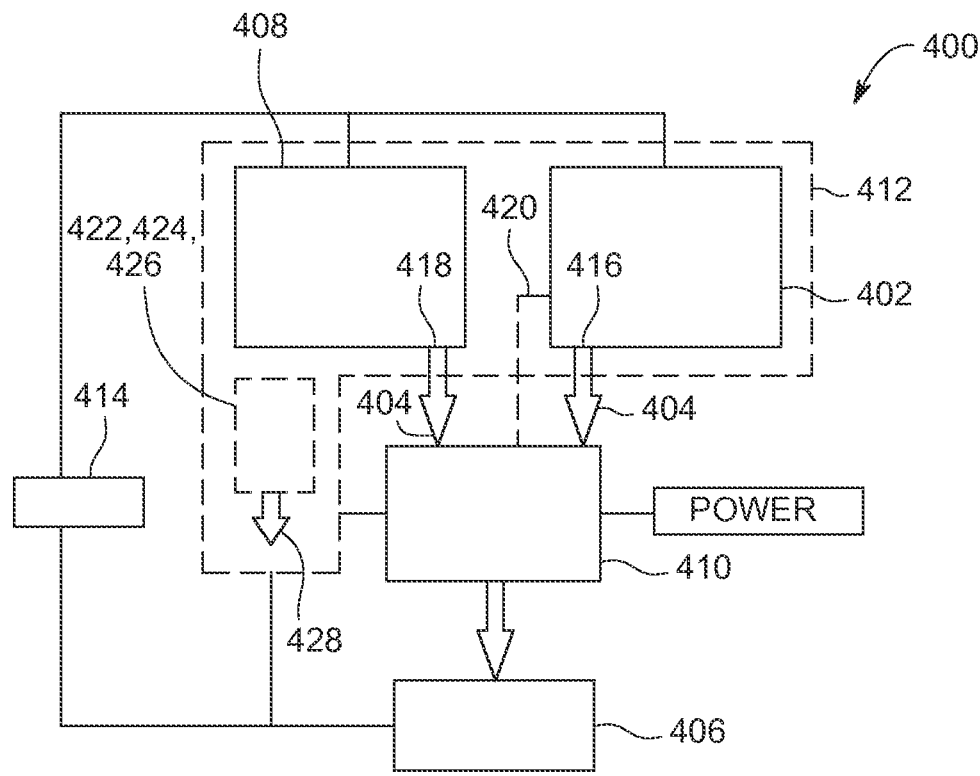
FIG. 4 is a schematic diagram of another embodiment of a control apparatus.

FIG. 4 shows another embodiment of a control apparatus (e.g., control apparatus for controlling a machine) 400 that includes a first controller 402 configured to generate control signals 404 for controlling an engine or other machine 406, a second controller (e.g., a backup or secondary controller) 408 configured to generate the control signals 404 for controlling the machine, a transfer circuit 410, and an arbiter circuit 412. The transfer circuit is coupled between the machine and respective control outputs 416, 418 of the first controller and the second controller. The transfer circuit is configured to switch from a first state, where the transfer circuit passes the control signals from the first controller to the machine, to a second state, where the transfer circuit passes the control signals from the second controller to the machine, responsive to receiving a first failure signal 420 from the first controller. (For example, the first controller may be configured to generate the first failure signal upon a self-determination that the first controller has failed, entered into a fault state or condition, or is otherwise not functioning nominally. The first failure signal may be a zero voltage signal that is generated by the first controller based on the self-determination, or upon the first controller powering off.) The arbiter circuit is operably coupled to the transfer circuit and has at least three arbiters 422, 424, 426. The arbiter circuit is configured to control the transfer circuit from the first state to the second state (for passage of the control signals from the second controller to the machine instead of from the first controller to the machine) responsive to any two or more of the at least three arbiters generating second failure signals 428. (As noted elsewhere herein, the arbiters may include circuit portions of the controllers 402, 408. Thus, although the arbiters are shown schematically as separate from the controllers in FIG. 4, they are not necessarily separate components.)

In embodiments, the apparatus 400 includes one or more sensors 414 and/or other equipment for providing information about an operational state of the engine or other machine 406 to the controllers, transfer circuit, and/or arbiter circuit.

Figure 5:
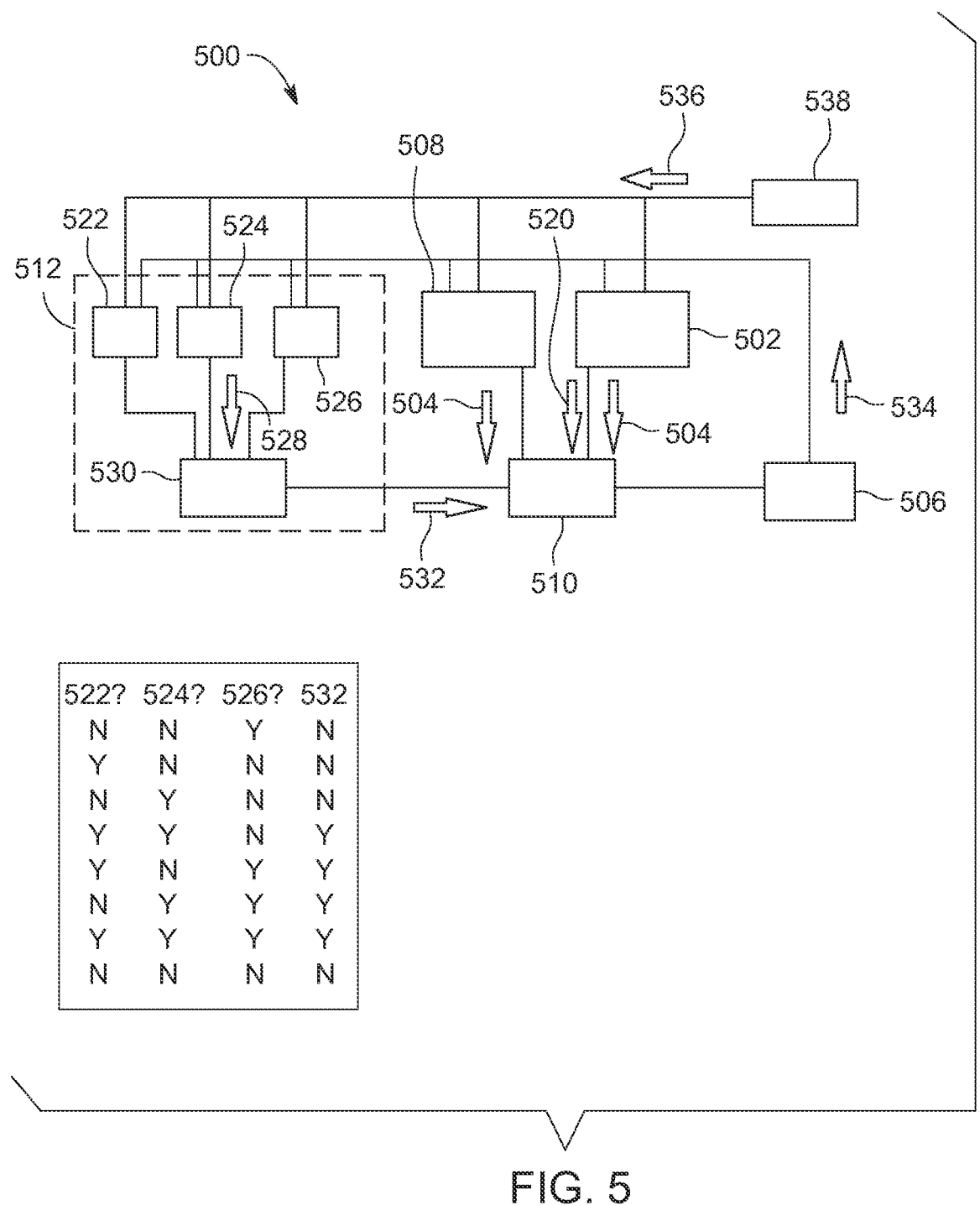
FIG. 5 is a schematic diagram of another embodiment of a control apparatus.

FIG. 5 shows another embodiment of a control apparatus (e.g., control apparatus for controlling a machine) 500 that includes a first controller 502 configured to generate control signals 504 for controlling an engine or other machine 506, a second controller (e.g., a backup or secondary controller) 508 configured to generate the control signals 504 for controlling the machine, a transfer circuit 510, and an arbiter circuit 512. The transfer circuit is coupled between the machine and respective control outputs of the first controller and the second controller. The transfer circuit is configured to switch from a first state, where the transfer circuit passes the control signals from the first controller to the machine, to a second state, where the transfer circuit passes the control signals from the second controller to the machine, responsive to receiving a first failure signal 520 from the first controller. (For example, the first controller may be configured to generate the first failure signal upon a self-determination that the first controller has failed, entered into a fault state or condition, or is otherwise not functioning nominally. The first failure signal may be a zero voltage signal that is generated by the first controller based on the self-determination, or upon the first controller powering off.) The arbiter circuit is operably coupled to the transfer circuit and has at least three arbiters 522, 524, 526. The arbiter circuit is configured to control the transfer circuit from the first state to the second state (for passage of the control signals from the second controller to the machine instead of from the first controller to the machine) responsive to any two or more of the at least three arbiters generating second failure signals 528. (As noted elsewhere herein, the arbiters may include circuit portions of the controllers 402, 408, e.g., SIOMs of the two controllers, plus the second controller itself. Thus, although the arbiters are shown schematically as separate from the controllers in FIG. 5, they are not necessarily separate components.) For this purpose, the arbiter circuit may include a vote tabulator circuit 530. The vote tabulator circuit 530 is configured to output a control signal 532 to control the transfer circuit from the first state to the second state whenever any two or more of the three arbiters 522, 524, 526 (e.g., first and second, or second and third, or first and third, or all three) generate the second failure signal 528. For this purpose, the vote tabulator circuit 530 may include a discrete or other logic circuit that implements a truth table as shown in FIG. 5. Alternatively, the vote tabulator circuit may include a parallel network of series-connected switches, as described elsewhere herein. The arbiters 522, 524, 526 are configured to generate the second failure signals 528 responsive to determining that the first controller has failed, entered into a fault state or condition, or is otherwise not functioning nominally, e.g., based on comparing a sensed operational condition of the machine, as provided by a sensor signal or other signal 534 from the machine, to a commanded operational condition of the machine, such as provided by a command signal 536 from an operator control 538. In embodiments where the machine is an engine, the arbiters may carry out a determination as described above in regards to FIG. 3.

Figure 6:
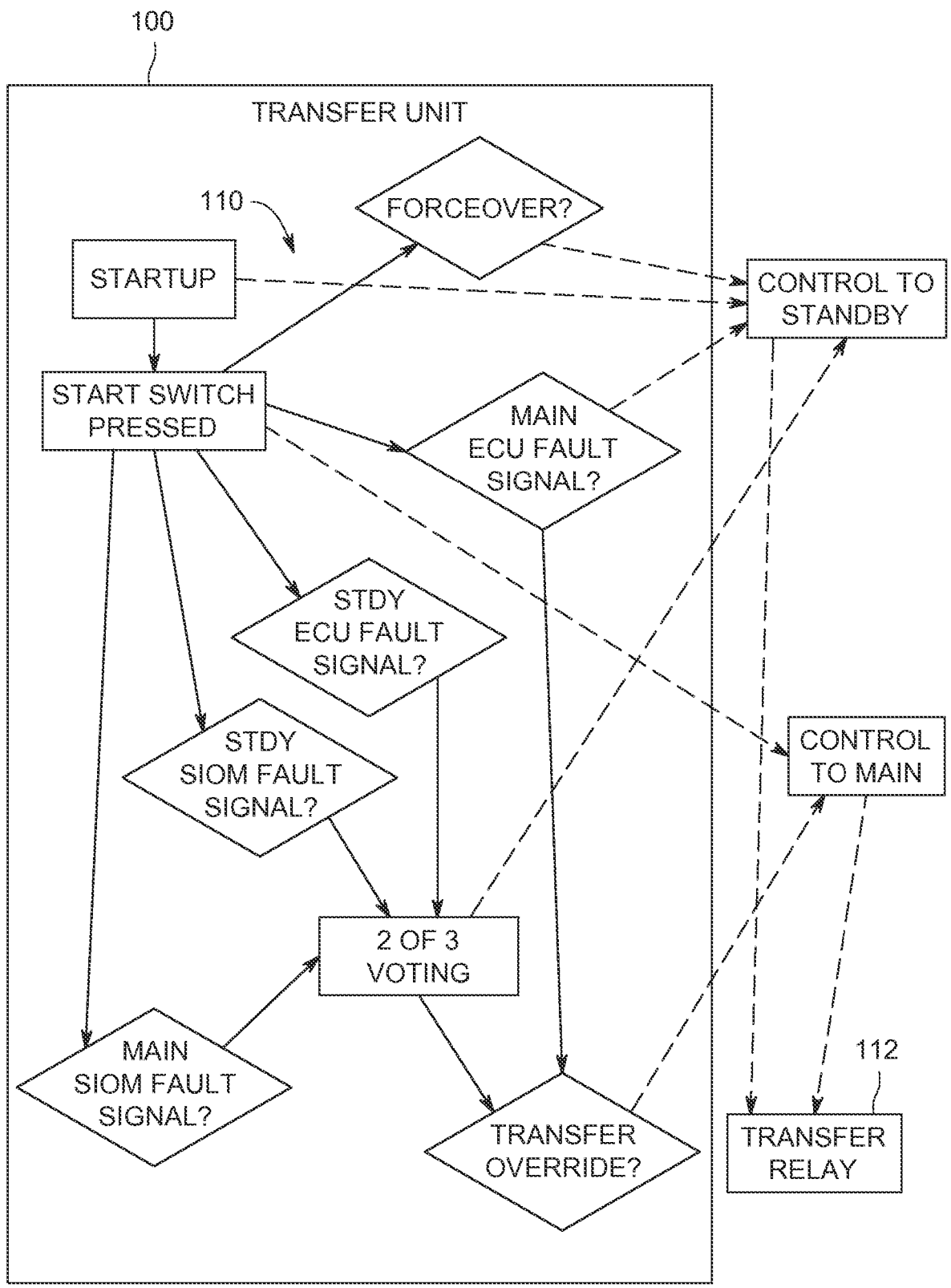
FIG. 6 shows schematically an arbiter panel process as implemented by the embodiment of the invention shown in FIG. 1. The process may also be implemented by the apparatuses shown in FIGS. 4-5.

FIG. 6 shows a state diagram of a control transfer process as may be implemented in the apparatus of FIG. 1, or by the apparatuses in FIG. 4 or 5. As indicated, upon startup, control lies with the standby controller. When a start switch is pressed, control is transferred to the main controller. Subsequently, if the main controller issues a fault or failure signal, control is transferred to the standby controller, unless a transfer override switch is actuated. Additionally, subsequently, if a force-over switch is actuated, control is transferred to the standby controller. Additionally subsequently, if any two of three arbiters (e.g., main SIOM, standby SIOM, and standby controller) generate signals indicative of, and/or responsive to, failure of the main controller, control is transferred to the standby controller, unless the transfer override switch is actuated. Control is transferred between the two controllers by controlling a transfer relay that is interposed between the controllers and a machine (e.g., engine) being controlled.

In an embodiment, a control apparatus (e.g., control apparatus for controlling a machine) includes a first controller configured to generate control signals for controlling an engine or other machine, a second controller (e.g., a backup or secondary controller) configured to generate the control signals for controlling the machine, a transfer circuit, and an arbiter circuit. The transfer circuit is coupled between the machine and respective control outputs of the first controller and the second controller. The transfer circuit is configured to switch from a first state, where the transfer circuit passes the control signals from the first controller to the machine, to a second state, where the transfer circuit passes the control signals from the second controller to the machine, responsive to receiving a first failure signal from the first controller. (For example, the first controller may be configured to generate the first failure signal upon a self-determination that the first controller has failed, entered into a fault state or condition, or is otherwise not functioning nominally. The first failure signal may be a zero voltage signal that is generated by the first controller based on the self-determination, or upon the first controller powering off.) The arbiter circuit is operably coupled to the transfer circuit and has at least three arbiters. The arbiter circuit is configured to control the transfer circuit from the first state to the second state (for passage of the control signals from the second controller to the machine instead of from the first controller to the machine) responsive to any two or more of the at least three arbiters generating second failure signals.

In another embodiment, the arbiters are configured to generate the second failure signals responsive to determining that the first controller has failed, entered into a fault state or condition, or is otherwise not functioning nominally, e.g., based on comparing a sensed operational condition of the machine, such as sensed engine speed, to a commanded operational condition of the machine, such as commanded engine speed from a throttle or other operator control.

In another embodiment, a control apparatus (e.g., control apparatus for an engine) includes a first engine controller configured to generate engine control signals for controlling an engine, a second engine controller configured to generate the engine control signals for controlling the engine, a transfer circuit, and an arbiter circuit. The transfer circuit is coupled between the engine and respective control outputs of the first engine controller and the second engine controller. The transfer circuit is configured to switch from a first state, where the transfer circuit passes the engine control signals from the first engine controller to the engine, to a second state, where the transfer circuit passes the engine control signals from the second engine controller to the engine, responsive to receiving a first failure signal from the first engine controller. The arbiter circuit is operably coupled to the transfer circuit and has at least three arbiters. The arbiter circuit is configured to control the transfer circuit from the first state to the second state responsive to any two or more of the at least three arbiters generating second failure signals.

In another embodiment, the apparatus further includes one or more engine speed sensors operably coupled to the arbiters. The arbiters are configured to receive respective one or more engine speed signals of an engine speed of the engine from the one or more engine speed sensors. The arbiters are also configured to receive a reference signal of an ordered speed of the engine, and are configured to generate the second failure signals based on the engine speed and the ordered speed. For example, each of the arbiters may be configured to generate the second failure signal: responsive to the engine speed continuously decreasing with respect to the ordered speed for at least a designated time period (e.g., the ordered speed is constant but the engine speed decreases during the designated time period); and/or responsive to the engine speed falling below the ordered speed by at least a designated speed amount; and/or responsive to the engine speed falling below a designated speed floor set at a margin above an engine idle speed of the engine.

In another embodiment, the three arbiters include a first SIOM of the first engine controller, a second SIOM (e.g., of the second engine controller or otherwise, and the second engine controller.

In another embodiment, the transfer circuit includes a transfer relay and a parallel network of switches for controlling the transfer relay. The parallel network of switches includes first and second switches connected in series and configured to be respectively controlled by the second failure signals from a first and a second of the at least three arbiters, third and fourth switches connected in series and configured to be respectively controlled by the second failure signals from the second and a third of the at least three arbiters, and fifth and sixth switches connected in series and configured to be respectively controlled by the second failure signals from the first and the third of the at least three arbiters. Responsive to the second failure signals being present at any of both the first and second switches, or both the third and fourth switches, or both the fifth and sixth switches, the parallel network of switches is configured to control the transfer relay for the transfer circuit to be in the second state such that the transfer circuit passes the engine control signals from the second engine controller to the engine.

In any of the embodiments here, the control apparatus may be disposed in a marine vessel, for controlling an engine of the marine vessel. In one embodiment, the marine vessel has one engine only. In another embodiment, a marine vessel includes a hull, an engine disposed in the hull, and a control apparatus disposed in the hull and configured as set forth herein to control the engine.

In another embodiment, a control apparatus includes a transfer relay and a transfer unit. The transfer relay is configured, in a default condition (i.e., in a first mode or state of operation of the transfer relay), to pass engine commands from a standby controller to an engine, and is also configured, in a run condition (.e., in a second mode or state of operation of the transfer relay), to pass the engine commands from a main controller to the engine. ("Main" and "standby" refer generally to two controllers that are configured, in at least some modes of operations, to produce the same control output signals based on the same control input signals.) The transfer unit is configured, in a run condition (i.e., in a first mode or state of operation of the transfer unit), to set the transfer relay to the run condition of the transfer relay, and is further configured, in a startup condition (i.e., in a second mode or state of operation of the transfer unit), to set the transfer relay to the default condition of the transfer relay.

The transfer unit is configured to transition from the run condition of the transfer unit to the startup condition of the transfer unit responsive to receiving a first main controller failure indication from the main controller. The transfer unit is also configured to transition from the run condition of the transfer unit to the startup condition of the transfer unit responsive to receiving second main controller failure indications from any two of three arbiters. The three arbiters may include, for example, a first SIOM of the main controller, a second SIOM (e.g., of the standby controller or otherwise), and the standby controller.

In another embodiment, the transfer unit includes a transfer override switch. The transfer unit is configured, responsive to the transfer override switch being in an actuated state, not to transition from the run condition of the transfer unit to the startup condition of the transfer unit responsive to receiving the first or second main controller failure indications.

In another embodiment, the transfer relay includes a plurality of single pole double throw relays having respective common poles, normally closed poles, normally open poles, and coils. The common poles of the relays are connected to the engine, the normally closed poles of the relays are connected to receive the engine commands from the standby controller, the normally open poles of the relays are connected to receive the engine commands from the main controller, and the coils of the relays are connected to be energized in unison by the transfer unit. For example, the default condition of the transfer relay may correspond to the common poles of the relays being electrically connected to the normally closed poles of the relays when the coils are de-energized, and the run condition of the transfer relay may correspond to the common poles of the relays being electrically connected to the normally open poles of the relays when the coils are energized.

In another embodiment, the transfer unit comprises a parallel network of switches for actuating the transfer relay. The parallel network of switches includes first and second switches connected in series and respectively energized to opened conditions by the main controller failure indications from a first and a second of the three arbiters, third and fourth switches connected in series and respectively energized to opened conditions by the main controller failure indications from the second and a third of the three arbiters, and fifth and sixth switches connected in series and respectively energized to opened conditions by the main controller failure indications from the first and the third of the three arbiters, such that responsive to the transfer unit receiving the main controller failure indications from any two of the three arbiters, the transfer relay becomes de-energized and returns to its default condition.

In another embodiment, the switches of the transfer unit are relays and the transfer relay is manually operable to its default condition and to its run condition.

In another embodiment, the transfer relay includes plural semiconductor switches operable by one or more gate drive units that are configured to be energized by the transfer unit. The plural semiconductor switches include a first plurality of the semiconductor switches connected to, while energized, deliver the engine commands from the main controller to the engine, a plurality of connections for delivering the engine commands from the standby controller to the engine, and a second plurality of the semiconductor switches configured to, while energized, divert from the plurality of connections the engine commands from the standby controller. The transfer unit is connected to energize and to de-energize together both the first and second pluralities of semiconductor switches.

In another embodiment, each of the arbiters is configured to generate the second main controller failure indication based on a sensed engine speed of the engine and an ordered speed of the engine. For example, each of the arbiters may be configured to generate the second main controller failure indication: responsive to the engine speed continuously decreasing with respect to the ordered speed for at least a designated time period; and responsive to the engine speed falling below the ordered speed by at least a designated speed amount; and responsive to the engine speed falling below a designated speed floor set at a margin above an engine idle speed of the engine.

In embodiments, an apparatus (e.g., for allocating engine control authority between a main controller and a standby controller) includes a transfer relay that has a default condition in which it receives engine commands from the standby controller and sends the engine commands to an engine, and that has a run condition in which it receives engine commands from the main controller and sends the engine commands to the engine. The apparatus also includes a transfer unit connected to receive a main controller failure indication from the main controller and from each of at least three arbiters. The transfer unit has a run condition in which it sets the transfer relay to its run condition, and has a startup condition in which it sets the transfer relay to its default condition. The transfer unit can be actuated from its startup condition to its run condition by an operator actuating a start switch while the main controller is operating normally. The transfer unit is actuated from its run condition to its startup condition in case it receives a main controller failure indication from the main controller or from any two of the three arbiters, or by an operator actuating a reset switch.

In another embodiment, a method (e.g., a method of controlling an engine or other machine) includes, with a first controller, generating control signals to control a machine. The method further includes, with a second controller, generating the control signals to control the machine, and, with a transfer circuit coupled between the machine and respective control outputs of the first controller and the second controller, switching from a first state, wherein the transfer circuit passes the control signals from the first controller to the machine, to a second state, wherein the transfer circuit passes the control signals from the second controller to the machine. The switching from the first state to the second state is done responsive to receiving a first failure signal from the first controller. The method further includes, with an arbiter circuit operably coupled to the transfer circuit and having at least three arbiters, controlling the transfer circuit from the first state to the second state responsive to any two or more of the at least three arbiters generating second failure signals.

In another embodiment, the method further includes the arbiters generating the second failure signals responsive to a determination that the first controller has failed, entered into a fault state or condition, or is otherwise not functioning nominally. The determination may be carried out by the arbiters, and may be based on a comparison of a sensed operational condition of the machine, such as sensed engine speed, to a commanded operational condition of the machine, such as commanded engine speed from a throttle or other operator control. For example, in the case of an engine, the comparison may include determining that the engine speed has continuously decreased with respect to the ordered speed for at least a designated time period; and/or that the engine speed has fallen below the ordered speed by at least a designated speed amount; and/or that the engine speed fell below a designated speed floor set at a margin above an engine idle speed of the engine.

In another embodiment, a method (e.g., a method of controlling an engine) includes, with a first engine controller, generating engine control signals to control an engine, and with a second engine controller, generating the engine control signals to control the engine. The method further includes, with a transfer circuit coupled between the engine and respective control outputs of the first engine controller and the second engine controller, switching from a first state, where the transfer circuit passes the engine control signals from the first engine controller to the engine, to a second state, where the transfer circuit passes the engine control signals from the second engine controller to the engine. Switching from the first state to the second state is carried out responsive to receiving a first failure signal from the first engine controller. The method further includes, with an arbiter circuit operably coupled to the transfer circuit and having at least three arbiters, controlling the transfer circuit from the first state to the second state responsive to any two or more of the at least three arbiters generating second failure signals. The method may further include the arbiters generating the second failure signals responsive to a determination that the first controller has failed, entered into a fault state or condition, or is otherwise not functioning nominally. The determination may be carried out by the arbiters, and may be based on a comparison of a sensed operational condition of the engine, such as sensed engine speed, to a commanded operational condition of the engine, such as commanded engine speed from a throttle or other operator control.

Aspects of the invention also provide a method for arbiter voting whether to transfer engine control from a main controller to a standby controller. The method includes receiving from the main controller and from each of at least three arbiters a vote whether to transfer control, and transferring control responsive to at least two of the arbiters voting for transfer, and responsive to the main controller voting for transfer.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The terms "including" and "in which" are used as the plain-English equivalents of the respective terms "comprising" and "wherein." Moreover, the terms "first," "second," "third," "upper," "lower," "bottom," "top," etc. are used merely as labels, and are not intended to impose numerical or positional requirements on their objects.

This written description uses examples to disclose several embodiments of the invention, including the best mode, and also to enable one of ordinary skill in the art to practice the embodiments of invention, including making and using any devices or systems and performing any incorporated methods.

As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A control apparatus comprising:
   a first controller configured to generate first control signals for controlling a machine;
   a second controller configured to generate second control signals for controlling the machine;
   a transfer circuit coupled between the machine and control outputs of the first controller and the second controller, wherein the transfer circuit is configured to switch from a first state, where the transfer circuit passes the first control signals from the first controller to the machine, to a second state, where the transfer circuit passes the second control signals from the second controller to the machine, responsive to receiving a first failure signal from the first controller; and
   an arbiter circuit operably coupled to the transfer circuit and having at least three arbiters,
   wherein each of the at least three arbiters is configured to determine that the first controller has failed, the first controller has entered into a fault state or condition, or the first controller is not functioning nominally;
   wherein the arbiter circuit is configured to control the transfer circuit from the first state to the second state responsive to any two or more of the at least three arbiters generating second failure signals responsive to any two or more of the at least three arbiters determining that the first controller has failed, the first controller has entered into the fault state or condition, or the first controller is not functioning nominally;
   wherein the machine is an engine, the first controller is a first engine controller, the second controller is a second engine controller, and the first and second control signals are engine control signals; and
   wherein the at least three arbiters include a first supervisory input/output module (SIOM) of the first engine controller, a second SIOM, and the second engine controller.

2. The apparatus of claim 1, further comprising one or more engine speed sensors operably coupled to the at least three arbiters, wherein the at least three arbiters are configured to receive one or more engine speed signals of an engine speed of the engine from the one or more engine speed sensors, and wherein the at least three arbiters are configured to receive a reference signal of an ordered speed of the engine, and wherein the at least three arbiters are configured to generate second failure signals based on the engine speed and the ordered speed.

3. The apparatus of claim 2, wherein each of the arbiters is configured to generate the second failure signals responsive to the engine speed decreasing with respect to the ordered speed for at least a designated time period; or responsive to the engine speed falling below the ordered speed by at least a designated speed amount; or responsive to the engine speed falling below a designated speed floor set at a margin above an engine idle speed of the engine.

4. The apparatus of claim 1, wherein:
   the transfer circuit comprises a transfer relay and a parallel network of switches for controlling the transfer relay;
   the parallel network of switches includes first and second switches connected in series and configured to be respectively controlled by second failure signals from a first arbiter and a second arbiter of the at least three arbiters, third and fourth switches connected in series and configured to be respectively controlled by the second failure signals from the second arbiter and a third arbiter of the at least three arbiters, and fifth and sixth switches connected in series and configured to be controlled by the second failure signals from the first arbiter and the third arbiter of the at least three arbiters; and
   responsive to the second failure signals being present at any of the first and second switches, or both the third and fourth switches, or both the fifth and sixth switches, the parallel network of switches is configured to control the transfer relay for the transfer circuit to be in the second state such that the transfer circuit passes engine control signals from the second engine controller to the engine.

5. A control apparatus comprising:
   a transfer relay that is configured, in a default condition, to pass engine commands from a standby controller to an engine, and that is configured, in a run condition, to pass the engine commands from a main controller to the engine;
   a transfer unit that is configured, in the run condition, to set the transfer relay to the run condition of the transfer relay, and that is configured, in a startup condition, to set the transfer relay to the default condition of the transfer relay;
   wherein the transfer unit is configured to transition from the run condition of the transfer unit to the startup condition of the transfer unit responsive to receiving a first main controller failure indication from the main controller and responsive to receiving second main controller failure indications from any two of three arbiters; and
   an arbiter circuit operably coupled to the transfer unit and having at least three arbiters;
   wherein each of the at least three arbiters is configured to determine that the first main controller has failed, the first main controller has entered into a fault state or condition, or the first main controller is not functioning nominally; and
   wherein the at least three arbiters include a first supervisory input/output module (SIOM) of the main controller, a second SIOM, and the standby controller.

6. The apparatus of claim 5, wherein the transfer unit includes a transfer override switch, and wherein the transfer unit is configured, responsive to the transfer override switch being in an actuated state, not to transition from the run condition of the transfer unit to the startup condition of the transfer unit responsive to receiving the first or second main controller failure indications.

7. The apparatus of claim 5, wherein:
   the transfer relay includes a plurality of single pole double throw relays having respective common poles, normally closed poles, normally open poles, and coils; and
   the common poles of the relays are connected to the engine, the normally closed poles of the relays are connected to receive the engine commands from the standby controller, the normally open poles of the relays are connected to receive the engine commands from the main controller, and the coils of the relays are connected to be energized in unison by the transfer unit.

8. The apparatus of claim 7, wherein the default condition of the transfer relay corresponds to the common poles of the relays being electrically connected to the normally closed poles of the relays when the coils are de-energized and the run condition of the transfer relay corresponds to the common poles of the relays being electrically connected to the normally open poles of the relays when the coils are energized.

9. The apparatus of claim 5, wherein the transfer unit comprises a parallel network of switches for actuating the transfer relay, and wherein the parallel network of switches includes first and second switches connected in series and respectively energized to opened conditions by the main controller failure indications from a first arbiter and a second arbiter of the at least three arbiters, third and fourth switches connected in series and respectively energized to opened conditions by the main controller failure indications from the second arbiter and a third arbiter of the at least three arbiters, and fifth and sixth switches connected in series and respectively energized to opened conditions by the main controller failure indications from the first arbiter and the third arbiter of the at least three arbiters, such that responsive to the transfer unit receiving the main controller failure indications from any two of the at least three arbiters, the transfer relay becomes de-energized and returns to the default condition.

10. The apparatus of claim 9, wherein the transfer relay includes plural semiconductor switches operable by one or more gate drive units that are configured to be energized by the transfer unit, wherein the plural semiconductor switches of the transfer relay include a first plurality of the semiconductor switches, while energized, deliver the engine commands from the main controller to the engine, a plurality of connections for delivering the engine commands from the standby controller to the engine, and a second plurality of the semiconductor switches configured to, while energized, divert the engine commands from the plurality of connections, wherein the transfer unit is connected to energize and to de-energize together both the first and second pluralities of semiconductor switches.

11. The apparatus of claim 5, wherein each of the at least three arbiters is configured to generate the second main controller failure indication based on a sensed engine speed of the engine and an ordered speed of the engine.

12. The apparatus of claim 11, wherein each of the at least three arbiters is configured to generate the second main controller failure indication: responsive to the engine speed continuously decreasing with respect to the ordered speed for at least a designated time period; or responsive to the engine speed falling below the ordered speed by at least a designated speed amount; or responsive to the engine speed falling below a designated speed floor set at a margin above an engine idle speed of the engine.

13. A marine vessel comprising a hull, the apparatus of claim 5 disposed in the hull, and the engine disposed in the hull.

14. A method comprising:
generating first control signals to control a machine with a first controller;
generating second control signals to control the machine with a second controller;
with a transfer circuit coupled between the machine and respective control outputs of the first controller and the second controller, switching from a first state, wherein the transfer circuit passes the control signals from the first controller to the machine, to a second state, wherein the transfer circuit passes the control signals from the second controller to the machine, responsive to receiving a first failure signal from the first controller; and
with an arbiter circuit operably coupled to the transfer circuit and having at least three arbiters, controlling the transfer circuit from the first state to the second state responsive to any two or more of the at least three arbiters generating second failure signals; and
wherein each of the at least three arbiters is configured to determine that the first controller has failed, the first controller has entered into a fault state or condition, or the first controller is not functioning nominally; and
wherein the at least three arbiters include a first supervisory input/output module (SIOM) of the main controller, a second SIOM, and a standby controller.

15. The apparatus of claim 1, wherein the arbiter circuit is configured to control the transfer circuit from the first state to the second state responsive to any two of the at least three arbiters recommending passage of the control signals.

16. The apparatus of claim 5, wherein the second main controller failure indications are based on the two of the three arbiters determining that the first main controller has failed, the first main controller has entered into a fault state or condition, or the first main controller is not functioning nominally.

17. The method of claim 14, wherein with an arbiter circuit, controlling the transfer circuit from the first state to the second state responsive to recommending passage of the control signals.

* * * * *